(12) United States Patent
Kono et al.

(10) Patent No.: US 11,387,490 B2
(45) Date of Patent: Jul. 12, 2022

(54) ADDITIVE FOR NONAQUEOUS ELECTROLYTE SOLUTIONS, NONAQUEOUS ELECTROLYTE SOLUTION, AND ELECTRICITY STORAGE DEVICE

(71) Applicant: Sumitomo Seika Chemicals Co., Ltd., Hyogo (JP)

(72) Inventors: Yuki Kono, Hyogo (JP); Shohei Fujimoto, Hyogo (JP); Yasuyuki Takai, Hyogo (JP); Koji Fujita, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 105 days.

(21) Appl. No.: 16/491,519

(22) PCT Filed: Mar. 6, 2018

(86) PCT No.: PCT/JP2018/008581
§ 371 (c)(1),
(2) Date: Sep. 5, 2019

(87) PCT Pub. No.: WO2018/164124
PCT Pub. Date: Sep. 13, 2018

(65) Prior Publication Data
US 2019/0393552 A1    Dec. 26, 2019

(30) Foreign Application Priority Data
Mar. 7, 2017   (JP) .............................. JP2017-043206

(51) Int. Cl.
*H01M 10/0567* (2010.01)
*H01M 10/0525* (2010.01)
*H01M 10/0569* (2010.01)
*H01M 4/62* (2006.01)
*H01M 4/02* (2006.01)

(52) U.S. Cl.
CPC ... *H01M 10/0567* (2013.01); *H01M 10/0525* (2013.01); *H01M 10/0569* (2013.01); *H01M 4/622* (2013.01); *H01M 2004/027* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 4,167,458 | A | 9/1979 | Louzos et al. |
| 2009/0011367 | A1 | 1/2009 | Omatsu et al. |
| 2014/0179743 | A1 | 6/2014 | Shapiro et al. |
| 2016/0004157 | A1 | 1/2016 | Ito et al. |
| 2017/0271715 | A1 | 9/2017 | Kim et al. |

FOREIGN PATENT DOCUMENTS

| | | |
|---|---|---|
| CN | 104067361 | 9/2014 |
| CN | 104364958 | 2/2015 |
| CN | 106133986 | 11/2016 |
| EP | 2833381 | 2/2015 |
| EP | 2858164 | 4/2015 |
| JP | 63-102173 | 5/1988 |
| JP | 5-074486 | 3/1993 |
| JP | 10-050342 | 2/1998 |
| JP | 2010-092698 | 4/2010 |
| JP | 2012-056925 | 3/2012 |
| JP | 2017-208322 | 11/2017 |
| WO | 2015/147000 | 10/2015 |
| WO | 2017/043576 | 3/2017 |
| WO | 2018/016195 | 1/2018 |
| WO | 2008/164138 | 9/2018 |

OTHER PUBLICATIONS

Prochazka et al. "Sulfolanes. II. Hydroxy derivatives of Sulfolanes"; Collection of Czechoslovak Chemical Communications; (1959), 24. pp. 1509-1514.*
Dridge et al. "Tetrahydrothiophene 1,1-dioxide derivatives".Journal of Organic Chemistry (1962), 27, pp. 2889-2897.*
Alder et al. "Preparation and Some Reactions of 4-Methoxy-2,3-dihydrothiophene 1,1-dioxide"; Journal of Chemical Research, Synopses (1995), (6), pp. 250-251.*
Usenko et al. "Alkylation of malonic acid derivatives by sulfolanyl sulfonates". Ukrainskii Khimicheskii Zhurnal (Russian Edition) (1974),40(11), pp. 1177-1180.*
The extended European search report issued for European Patent Application No. 18763482.9, dated Nov. 25, 2020, 7 pages.
International Preliminary Report on Patentability issued in PCT/JP2018/008581, dated Sep. 19, 2019, 5 pages.

* cited by examiner

*Primary Examiner* — Laura Weiner
(74) *Attorney, Agent, or Firm* — Hamre, Schumann, Mueller & Larson, P.C.

(57) ABSTRACT

Disclosed is an additive for nonaqueous electrolyte solutions, which includes a compound represented by the following formula (1):

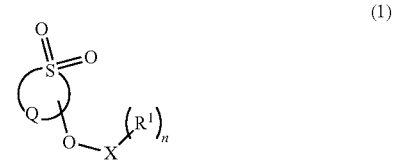

(1)

in the formula (1), Q represents an optionally substituted alkenylene group having 4 to 7 carbon atoms and forming a cyclic group together with the sulfur atom of the sulfonyl group, X represents a sulfonyl group, a phosphoryl group, or a carbonyl group, $R^1$ represents an optionally substituted alkyl group having 1 to 4 carbon atoms or the like, and n represents 1 or 2.

8 Claims, 1 Drawing Sheet

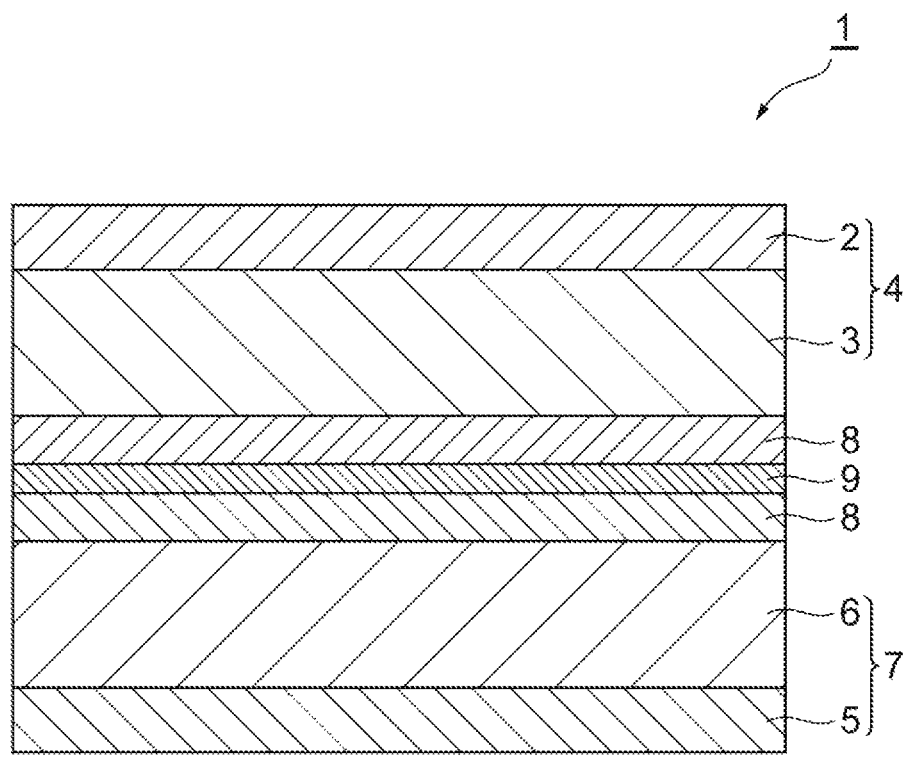

ADDITIVE FOR NONAQUEOUS ELECTROLYTE SOLUTIONS, NONAQUEOUS ELECTROLYTE SOLUTION, AND ELECTRICITY STORAGE DEVICE

TECHNICAL FIELD

The present invention relates to an additive for nonaqueous electrolyte solutions. The present invention also relates to a nonaqueous electrolyte solution containing the additive for nonaqueous electrolyte solutions and an electricity storage device using the nonaqueous electrolyte solution.

BACKGROUND ART

In recent years, along with an increase in attention to solving environmental problems and establishing a sustainable recycling-based society, nonaqueous electrolyte solution secondary batteries typified by lithium ion batteries and electricity storage devices such as an electric double layer capacitor have been widely studied. Among those, the lithium ion batteries are used as power sources for laptops, mobile phone, or the like from the viewpoint that they have high working voltages and energy densities. The lithium ion batteries are expected as a new power source from the viewpoint that they have higher energy densities than lead batteries and nickel-cadmium batteries, and a higher capacity of batteries is realized therewith. However, the lithium ion batteries have a problem in that the capacity of the batteries is reduced over time in charge/discharge cycles.

As a method for suppressing a reduction in the capacity of a battery over time in charge/discharge cycles, a method in which various additives are added to an electrolyte solution has been examined. The additives are decomposed during a first charge/discharge to form a film called a solid electrolyte interface (SEI) on a surface of an electrode. Since the SEI is formed during the first cycle of the charge/discharge cycles, the lithium ions can be transferred between electrodes through the SEI and there is no electricity consumption for the decomposition of a solvent and the like in the electrolyte solution. That is, formation of the SEI prevents the deterioration of electricity storage devices such as a nonaqueous electrolyte solution secondary battery in a case where the charge/discharge cycles are repeated, and contributes to an improvement of battery characteristics, storage characteristics, load characteristics, or the like.

As a technique for forming an SEI and improving battery characteristics and the like, for example, Patent Literature 1 discloses that charge/discharge cycle characteristics of a lithium secondary battery are improved by incorporating 1,3-propanesultone (PS) into an electrolyte solution. Further, Patent Literature 2 discloses that the capacity after storage and the recovered capacity after storage of a nonaqueous electrolyte solution secondary battery are increased by incorporating a 1,3,2-dioxaphospholane-2-oxide derivative or PS into an electrolyte solution. Patent Literature 3 discloses that cycle characteristics and the like of a lithium secondary battery are improved by adding a derivative of vinylene carbonate (VC) to an electrolyte solution.

CITATION LIST

Patent Literature

[Patent Literature 1] Japanese Unexamined Patent Publication No. S63-102173

[Patent Literature 2] Japanese Unexamined Patent Publication No. H10-50342

[Patent Literature 3] Japanese Unexamined Patent Publication No. H5-74486

SUMMARY OF INVENTION

Technical Problem

However, even with use of those additives, sufficient performance has not been obtained and there has been a demand for development of novel additives for further improving battery characteristics of electricity storage devices. In addition, the electrolyte solution in which a derivative of VC is used as an additive as described in Patent Literature 3 generates gases such as carbon dioxide upon decomposition of the derivative of VC on an electrode, which thus leads to a reduction in battery performance. Gas generation is particularly remarkable in a case where the charge/discharge cycles are repeated at a high temperature or over a long period of time.

An object of the present invention is to provide an additive for nonaqueous electrolyte solutions which makes it possible to improve battery characteristics such as initial resistance, discharge capacity retention rate, and suppression of a long-term increase in resistance, and suppress gas generation in a case where the additive for nonaqueous electrolyte solutions is used in an electricity storage device such as a nonaqueous electrolyte solution secondary battery. In addition, another object of the present invention is to provide a nonaqueous electrolyte solution containing the additive for nonaqueous electrolyte solutions and an electricity storage device using the nonaqueous electrolyte solution.

Solution to Problem

The present invention provides an additive for nonaqueous electrolyte solutions, including a compound represented by the following formula (1).

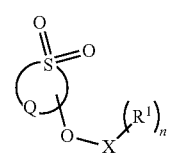

(1)

In the formula (1), Q represents an optionally substituted alkenylene group having 4 to 7 carbon atoms and forming a cyclic group together with the sulfur atom of the sulfonyl group, X represents a sulfonyl group, a phosphoryl group, or a carbonyl group, $R^1$ represents an optionally substituted alkyl group having 1 to 4 carbon atoms, an optionally substituted alkenyl group having 2 to 4 carbon atoms, an optionally substituted alkynyl group having 2 to 4 carbon atoms, an optionally substituted aryl group, an optionally substituted alkoxy group having 1 to 4 carbon atoms, an optionally substituted alkenyloxy group having 2 to 4 carbon atoms, an optionally substituted alkynyloxy group having 2 to 4 carbon atoms, or an optionally substituted aryloxy group, and n represents 1 or 2.

Advantageous Effects of Invention

According to the present invention, provided is an additive for nonaqueous electrolyte solutions that makes it possible to improve battery characteristics such as initial resistance, discharge capacity retention rate, and suppression of a long-term increase in resistance, and suppress gas generation in a case where the additive for nonaqueous electrolyte solutions is used in an electricity storage device. In addition, the additive for nonaqueous electrolyte solutions according to the present invention can form a stable solid electrolyte interface (SEI) on the surface of an electrode to improve battery characteristics such as cycle characteristics, a charge/discharge capacity, and internal resistance in a case where the additive for nonaqueous electrolyte solutions is used in an electricity storage device such as a nonaqueous electrolyte solution secondary battery and an electric double layer capacitor.

BRIEF DESCRIPTION OF DRAWINGS

FIG. 1 is a cross-sectional view schematically showing one example of a nonaqueous electrolyte solution secondary battery as an electricity storage device according to an embodiment.

DESCRIPTION OF EMBODIMENTS

Hereinafter, suitable embodiments of the present invention will be described in detail.

The additive for nonaqueous electrolyte solutions according to the present embodiment includes a compound represented by the following formula (1).

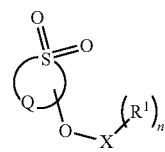

(1)

In the formula (1), Q represents an optionally substituted alkenylene group having 4 to 7 carbon atoms and forming a cyclic group together with the sulfur atom of the sulfonyl group, X represents a sulfonyl group, a phosphoryl group, or a carbonyl group, $R^1$ represents an optionally substituted alkyl group having 1 to 4 carbon atoms, an optionally substituted alkenyl group having 2 to 4 carbon atoms, an optionally substituted alkynyl group having 2 to 4 carbon atoms, an optionally substituted aryl group, an optionally substituted alkoxy group having 1 to 4 carbon atoms, an optionally substituted alkenyloxy group having 2 to 4 carbon atoms, an optionally substituted alkynyloxy group having 2 to 4 carbon atoms, or an optionally substituted aryloxy group, and n represents 1 or 2.

With regard to $R^1$, in a case where the alkyl group having 1 to 4 carbon atoms, the alkenyl group having 2 to 4 carbon atoms, the alkynyl group having 2 to 4 carbon atoms, the alkoxy group having 1 to 4 carbon atoms, the alkenyloxy group having 2 to 4 carbon atoms, or the alkynyloxy group having 2 to 4 carbon atoms is substituted, the substituent may be, for example, a halogen atom, an aryl group, a halogenated aryl group (for example, a fluorinated aryl group such as a 2-fluorophenyl group, a 3-fluorophenyl group, a 4-fluorophenyl group, and a perfluorophenyl group), an alkoxy group, a halogenated alkoxy group, or a combination thereof. With regard to $R^1$, in a case where the aryl group or the aryloxy group is substituted, the substituent may be, for example, a halogen atom, an alkyl group, a halogenated alkyl group (for example, a fluorinated alkyl group such as a trifluoromethyl group and a 2,2,2-trifluoroethyl group), an alkoxy group, a halogenated alkoxy group, or a combination thereof. In the present specification, an expression, "optionally substituted with a halogen atom", means that one or more hydrogen atoms included in each of $R^1$ groups may be substituted with halogen atoms. Examples of the halogen atom in the case include an iodine atom, a bromine atom, and a fluorine atom. From the viewpoint that the battery resistance is further lowered, a fluorine atom can be selected as the halogen atom.

X in the formula (1) represents a sulfonyl group, a phosphoryl group, or a carbonyl group. Typically, in a case where X is a sulfonyl group (—S(=O)$_2$—) or a carbonyl group (—C(=O)—), n is 1, and in a case where X is a phosphoryl group (—P(=O)<), n is 2. In a case of n=2, two $R^1$'s may be the same as or different from each other. From the viewpoint that gas generation is further suppressed, X may be a sulfonyl group.

From the viewpoints that the battery resistance is further lowered, $R^1$ in the formula (1) may be an alkyl group having 1 to 4 carbon atoms and optionally substituted with a halogen atom or a halogenated aryl group, or an alkoxy group having 1 to 4 carbon atoms and optionally substituted with a halogen atom, an aryl group or a halogenated aryl group.

From the viewpoint that a strong SEI is formed, $R^1$ in the formula (1) may be a group having an unsaturated bond. For example, $R^1$ may be an alkenyl group having 2 to 4 carbon atoms and optionally substituted with a halogen atom, an alkynyl group having 2 to 4 carbon atoms and optionally substituted with a halogen atom, an aryl group optionally substituted with a halogen atom, an alkyl group or a halogenated alkyl group, an alkenyloxy group having 2 to 4 carbon atoms and optionally substituted with a halogen atom, an alkynyloxy group having 2 to 4 carbon atoms and optionally substituted with a halogen atom, or an aryloxy group optionally substituted with a halogen atom, an alkyl group, a halogenated alkyl group or an alkoxy group.

From the viewpoint that the compound represented by the formula (1) exhibits more excellent ion conductivity, $R^1$ in the formula (1) may be an alkenyloxy group having 2 to 4 carbon atoms and optionally substituted with a halogen atom, an alkynyloxy group having 2 to 4 carbon atoms and optionally substituted with a halogen atom, or an aryloxy group optionally substituted with a halogen atom, an alkyl group, a halogenated alkyl group or an alkoxy group.

Examples of the alkyl group having 1 to 4 carbon atoms and optionally substituted with a halogen atom or a halogenated aryl group, include a methyl group, an ethyl group, an n-propyl group, an isopropyl group, an n-butyl group, an isobutyl group, a tert-butyl group, a trifluoromethyl group, a 1-fluoroethyl group, a 2-fluoroethyl group, a 1,1-difluoroethyl group, a 1,2-difluoroethyl group, a 2,2-difluoroethyl group, a 2,2,2-trifluoroethyl group, a perfluoroethyl group, a 1-fluoro-n-propyl group, a 2-fluoro-n-propyl group, a 3-fluoro-n-propyl group, a 1,1-difluoro-n-propyl group, a 1,2-difluoro-n-propyl group, a 1,3-difluoro-n-propyl group, a 2,2-difluoro-n-propyl group, a 2,3-difluoro-n-propyl group, a 3,3-difluoro-n-propyl group, a 3,3,3-trifluoro-n-propyl group, a 2,2,3,3,3-pentafluoro-n-propyl group, a perfluoro-n-propyl group, a 1-fluoroisopropyl group, a 2-fluoroisopropyl group, a 1,2-difluoroisopropyl group, a 2,2-difluoroisopropyl group, a 2,2'-difluoroisopropyl group, a 2,2,2,2',2',2'-hexafluoroisopropyl group, a 1-fluoro-n-butyl group, a 2-fluoro-n-butyl group, a 3-fluoro-n-butyl group, a 4-fluoro-n-butyl group, a 4,4,4-trifluoro-n-butyl group, a perfluoro-n-butyl group, a 2-fluoro-tert-butyl group, a perfluoro-tert-butyl group, a (2-fluorophenyl)methyl group, a (3-fluorophenyl)methyl group, a (4-fluorophenyl)methyl group, and a (perfluorophenyl)methyl group. As the alkyl group, a methyl group optionally substituted with a halogen atom can be selected.

Examples of the alkenyl group having 2 to 4 carbon atoms and optionally substituted with a halogen atom, include a vinyl group, an allyl group, an isopropenyl group, a 1-butenyl group, a 2-butenyl group, a 3-butenyl group, an isobutenyl group, a 1-fluorovinyl group, a 2-fluorovinyl group, a 1,2-difluorovinyl group, a 2,2-difluorovinyl group, a perfluorovinyl group, a 1-fluoroallyl group, a 2-fluoroallyl group, a 3-fluoroallyl group, and a perfluoroallyl group. As the alkenyl group, an allyl group optionally substituted with a halogen atom can be selected.

Examples of the alkynyl group having 2 to 4 carbon atoms and optionally substituted with a halogen atom, include a 1-propynyl group, a 2-propynyl group, a 1-butynyl group, a 2-butynyl group, a 3-butynyl group, a 3-fluoro-1-propynyl group, a 3,3-difluoro-1-propynyl group, a perfluoro-1-propynyl group, a 1-fluoro-2-propynyl group, a 1,1-difluoro-2-propynyl group, a 3-fluoro-1-butynyl group, a 4-fluoro-1-butynyl group, a 3,4-difluoro-1l-butynyl group, a 4,4-difluoro-1-butynyl group, and a perfluoro-1-butynyl group. As the alkynyl group, a 2-propynyl group optionally substituted with a halogen atom can be selected.

Examples of the aryl group optionally substituted with a halogen atom, an alkyl group or a halogenated alkyl group include a phenyl group, a tolyl group, a xylyl group, a naphthyl group, a 2-fluorophenyl group, a 3-fluorophenyl group, a 4-fluorophenyl group, a 2,3-difluorophenyl group, a 2,4-difluorophenyl group, a 3,5-difluorophenyl group, a 2,4,6-trifluorophenyl group, a perfluorophenyl group, a 3-fluoro-2-methylphenyl group, a 4-fluoro-2-methylphenyl group, a 5-fluoro-2-methylphenyl group, a 6-fluoro-2-methylphenyl group, a 2-fluoro-3-methylphenyl group, a 4-fluoro-3-methylphenyl group, a 5-fluoro-3-methylphenyl group, a 6-fluoro-3-methylphenyl group, a 2-fluoro-4-methylphenyl group, a 3-fluoro-4-methylphenyl group, a 2-trifluoromethylphenyl group, a 3-trifluoromethylphenyl group, a 4-trifluoromethylphenyl group, a 2-(2,2,2-trifluoroethyl)phenyl group, a 3-(2,2,2-trifluoroethyl)phenyl group, a 4-(2,2,2-trifluoroethyl)phenyl group, a perfluorotolyl group, a 2-fluoronaphthalen-1-yl group, a 3-fluoronaphthalen-1-yl group, a 4-fluoronaphthalen-1-yl group, a 5-fluoronaphthalen-1-yl group, a 6-fluoronaphthalen-1-yl group, a 7-fluoronaphthalen-1-yl group, a 8-fluoronaphthalen-1-yl group, a 1-fluoronaphthalen-2-yl group, a 3-fluoronaphthalen-2-yl group, a 4-fluoronaphthalen-2-yl group, a 5-fluoronaphthalen-2-yl group, a 6-fluoronaphthalen-2-yl group, a 7-fluoronaphthalen-2-yl group, a 8-fluoronaphthalen-2-yl group, and a perfluoronaphthyl group. As the aryl group, a phenyl group optionally substituted with a halogen atom can be selected.

Examples of the alkoxy group having 1 to 4 carbon atoms and optionally substituted with a halogen atom, an aryl group or a halogenated aryl group, include a methoxy group, an ethoxy group, an n-propoxy group, an isopropoxy group, an n-butoxy group, a tert-butoxy group, an isobutoxy group, a benzyloxy group, a fluoromethoxy group, a difluoromethoxy group, a trifluoromethoxy group, a 1-fluoroethoxy group, a 2-fluoroethoxy group, a 1,1-difluoroethoxy group, a 1,2-difluoroethoxy group, a 2,2-difluoroethoxy group, a 2,2,2-trifluoroethoxy group, a perfluoroethoxy group, a 1-fluoro-n-propoxy group, a 2-fluoro-n-propoxy group, a 3-fluoro-n-propoxy group, a 1,1-difluoro-n-propoxy group, a 1,2-difluoro-n-propoxy group, a 1,3-difluoro-n-propoxy group, a 2,2-difluoro-n-propoxy group, a 2,3-difluoro-n-propoxy group, a 3,3-difluoro-n-propoxy group, a 3,3,3-trifluoro-n-propoxy group, a 2,2,3,3,3-pentafluoro-n-propoxy group, a perfluoro-n-propoxy group, a 1-fluoroisopropoxy group, a 2-fluoroisopropoxy group, a 1,2-difluoroisopropoxy group, a 2,2-difluoroisopropoxy group, a 2,2'-difluoroisopropoxy group, a 2,2,2,2',2',2'-hexafluoroisopropoxy group, a 1-fluoro-n-butoxy group, a 2-fluoro-n-butoxy group, a 3-fluoro-n-butoxy group, a 4-fluoro-n-butoxy group, a 4,4,4-trifluoro-n-butoxy group, a perfluoro-n-butoxy group, a 2-fluoro-tert-butoxy group, a perfluoro-tert-butoxy group, a (2-fluorophenyl)methoxy group, a (3-fluorophenyl)methoxy group, a (4-fluorophenyl)methoxy group, and a (perfluorophenyl)methoxy group. As the alkoxy group, a methoxy group optionally substituted with a halogen atom and an ethoxy group optionally substituted with a halogen atom can be selected.

Examples of the alkenyloxy group having 2 to 4 carbon atoms and optionally substituted with a halogen atom, include a vinyloxy group, an isopropenyloxy group, a 2-propenyloxy group, a 1-methyl-2-propenyloxy group, a 2-methyl-2-propenyloxy group, a 1-butenyloxy group, a 2-butenyloxy group, a 3-butenyloxy group, a 1-fluorovinyloxy group, a 2-fluorovinyloxy group, a 1,2-difluorovinyloxy group, a 2,2-difluorovinyloxy group, a perfluorovinyloxy group, a 1-fluoroallyloxy group, a 2-fluoroallyloxy group, a 3-fluoroallyloxy group, and a perfluoroallyloxy group.

Examples of the alkynyloxy group having 2 to 4 carbon atoms and optionally substituted with a halogen atom, include an ethynyloxy group, a 1-propynyloxy group, a 2-propynyloxy group, a 1-methyl-2-propynyloxy group, a 1-butynyloxy group, a 2-butynyloxy group, a 3-butynyloxy group, a 3-fluoro-1-propynyloxy group, a 3,3-difluoro-1-propynyloxy group, a perfluoro-1-propynyloxy group, a 1-fluoro-2-propynyloxy group, a 1,1-difluoro-2-propynyloxy group, a 3-fluoro-1-butynyloxy group, a 4-fluoro-1-butynyloxy group, a 3,4-difluoro-1-butynyloxy group, a 4,4-difluoro-1-butynyloxy group, and a perfluoro-1-butynyloxy group.

Examples of the aryloxy group optionally substituted with a halogen atom, an alkyl group, a halogenated alkyl group or an alkoxy group include a phenoxy group, a 2-methylphenoxy group, a 3-methylphenoxy group, a 4-methylphenoxy group, a 2-ethylphenoxy group, a 3-ethylphenoxy group, a 4-ethylphenoxy group, a 2-methoxyphenoxy group, a 3-methoxyphenoxy group, a 4-methoxyphenoxy group, a 2-fluorophenoxy group, a 3-fluorophenoxy group, a 4-fluorophenoxy group, a 2,3-difluorophenoxy group, a 2,4-difluorophenoxy group, a 3,5-difluorophenoxy group, a 2,4,6-trifluorophenoxy group, a perfluorophenoxy group, a 3-fluoro-2-methylphenoxy group, a 4-fluoro-2-methylphenoxy group, a 5-fluoro-2-methylphenoxy group, a 6-fluoro-2-methylphenoxy group, a 2-fluoro-3-methylphenoxy group, a 4-fluoro-3-methylphenoxy group, a 5-fluoro-3-methylphenoxy group, a 6-fluoro-3-methylphenoxy group, a 2-fluoro-4-methylphenoxy group, a 3-fluoro-4-methylphenoxy group, a 2-trifluoromethylphenoxy group, a 3-trifluoromethylphenoxy group, and a 4-trifluoromethylphenoxy group.

Q in the formula (1) is an alkenylene group having 4 to 7 carbon atoms and forming a cyclic group together with the sulfur atom of the sulfonyl group, and is substituted with a group represented by $O-X-(R^1)_n$. Q may further be substituted with a substituent other than $O-X-(R^1)_n$. The substituent other than $-O-X-(R^1)_n$ may be, for example, a halogen atom. The alkenylene group as Q in the formula (1) may have a double bond formed with a carbon atom bonded to the sulfur atom of the sulfonyl group and a carbon atom adjacent thereto.

Specific examples of $R^2$ in the formula (1) include a group formed by removing one or more hydrogen atoms from —CH=CHCH$_2$CH$_2$—, —CH$_2$CH=CHCH$_2$—, —CH=CHCF$_2$CH$_2$—, —CH$_2$CH=CHCF$_2$—, —CF=CHCH$_2$CH$_2$—, —CH=CFCH$_2$CH$_2$—, —CF=CFCH$_2$CH$_2$—, —CH=CH—CHFCH$_2$—, —CH=CHCH$_2$CHF—, —CF=CFCHFCF$_2$—, —CH=CHCH$_2$CH$_2$CH$_2$—, —CH=CHCH$_2$CH=CH—, —CF=CHCH$_2$CH=CH—, —CH=CFCH$_2$CH=CH—, —CF=CFCH$_2$CH=CH—, —CH=CH—CHF—CH=CH—, —CH=CH—CH$_2$—CF=CH—, —CH=CHCH$_2$CH=CF—, —CF=CFCHFCF=CF—, —CH=CHCH$_2$CH$_2$CH$_2$CH$_2$—, —CH=CHCH$_2$CH$_2$CH=CH—, —CF=CHCH$_2$CH=CHCH$_2$—, —CH=CHCH$_2$CH$_2$CH$_2$CH$_2$—, —CF=CHCH$_2$CH=CHCH$_2$—, —CF=CHCH$_2$CH$_2$CH$_2$CH=CH—, or the like. In these groups, a carbon atom forming a double bond at an end may be bonded to the sulfur atom of the sulfonyl group in the formula (1).

In the formula (1), for example, in a similar manner as a compound represented by the following formula (1'), a group represented by O—X—(R$^1$)$_6$ may be bonded to the 3-position of a cyclic sulfone. This compound tends to exhibit particularly low LUMO energy and more excellent ion conductivity. In the formula (1'), $C^2$ and $C^3$ each represent a carbon atom, Q' represents an optionally substituted alkenylene group having 2 to 5 carbon atoms and forming a cyclic group together with the sulfur atom of the sulfonyl group, $C^2$, and $C^3$, and $R^2$, $R^3$, and $R^4$ each independently represent a hydrogen atom or a halogen atom. X, $R^1$, and n have the same meanings as X, $R^1$, and n, respectively, in the formula (1). The alkenylene group as Q' in the formula (1') may have a double bond formed by a carbon atom bonded to the sulfur atom of the sulfonyl group and a carbon atom adjacent thereto.

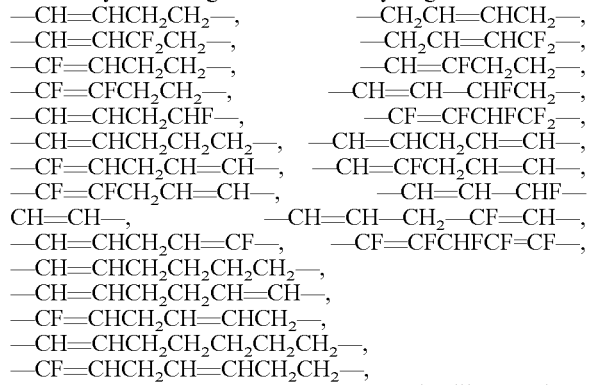

(1')

From the viewpoint that the cycle characteristics are further improved, the compound of the formula (1) may be a compound represented by the formula (2). X, $R^1$, and n in the formula (2) have the same meanings as X, $R^1$, and n, respectively, in the formula (1).

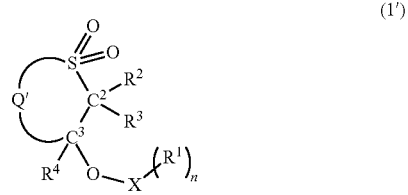

(2)

Examples of the compound represented by the formula (2) include 4-methylsulfonyloxytetrahydrothiophene-1,1-dioxid-2-ene, 4-ethylsulfonyloxytetrahydrothiophene-1,1-dioxid-2-ene, 4-phenylsulfonyloxytetrahydrothiophene-1,1-dioxid-2-ene, 4-(p-fluorophenyl)sulfonyloxytetrahydrothiophene-1,1-dioxid-2-ene, 4-(pentafluorophenyl)sulfonyloxytetrahydrothiophene-1,1-dioxid-2-ene, 4-(p-trifluoromethylphenyl)sulfonyloxytetrahydrothiophene-1,1-dioxid-2-ene, 4-[p-(2,2,2-trifluoroethyl)phenyl]sulfonyloxytetrahydrothiophene-1,1-dioxid-2-ene, 4-trifluoromethylsulfonyloxytetrahydrothiophene-1,1-dioxid-2-ene, 4-tert-butylsulfonyloxytetrahydrothiophene-1,1-dioxid-2-ene, 4-methoxysulfonyloxytetrahydrothiophene-1,1-dioxid-2-ene, 4-trifluoroethoxysulfonyloxytetrahydrothiophene-1,1-dioxid-2-ene, 4-allylsulfonyloxytetrahydrothiophene-1,1-dioxid-2-ene, 4-methylcarbonyloxytetrahydrothiophene-1,1-dioxid-2-ene, 4-ethylcarbonyloxytetrahydrothiophene-1,1-dioxid-2-ene, 4-phenylcarbonyloxytetrahydrothiophene-1,1-dioxid-2-ene, 4-trifluoromethylcarbonyloxytetrahydrothiophene-1,1-dioxid-2-ene, 4-tert-butylcarbonyloxytetrahydrothiophene-1,1-dioxid-2-ene, 4-methoxycarbonyloxytetrahydrothiophene-1,1-dioxid-2-ene, 4-trifluoroethoxycarbonyloxytetrahydrothiophene-1,1-dioxid-2-ene, 4-dimethylphosphinyloxytetrahydrothiophene-1,1-dioxid-2-ene, 4-diethylphosphinyloxytetrahydrothiophene-1,1-dioxid-2-ene, 4-bis-trifluoromethylphosphinyloxytetrahydrothiophene-1,1-dioxid-2-ene, 4-diphenylphosphinyloxytetrahydrothiophene-1,1-dioxid-2-ene, 4-diallylphosphinyloxytetrahydrothiophene-1,1-dioxid-2-ene, 4-divinylphosphinyloxytetrahydrothiophene-1,1-dioxid-2-ene, 4-dipropargylphosphinyloxytetrahydrothiophene-1,1-dioxid-2-ene, 4-dimethoxyphosphinyloxytetrahydrothiophene-1,1-dioxid-2-ene, 4-diethoxyphosphinyloxytetrahydrothiophene-1,1-dioxid-2-ene, 4-diphenoxyphosphinyloxytetrahydrothiophene-1,1-dioxid-2-ene, 4-bis-trifluoromethoxyphosphinyloxytetrahydrothiophene-1,1-dioxid-2-ene, 4-bis-allyloxyphosphinyloxytetrahydrothiophene-1,1-dioxid-2-ene, and 4-bis-cyclohexyloxyphosphinyloxytetrahydrothiophene-1,1-dioxid-2-ene.

The compound of the formula (1), (1'), or (2) is synthesized by combination of usual reactions using available raw materials. Examples of the synthesis method include a method in which a halide is reacted with 3-hydroxy-2-sulfolene.

The additive for nonaqueous electrolyte solutions according to the present embodiment may include only one kind or two or more kinds of the compounds represented by the formula (1).

The additive for nonaqueous electrolyte solutions according to the present embodiment may be used, as desired, in combination with additives such as a negative electrode protecting agent, a positive electrode protecting agent, a flame retardant, an anti-overcharging agent, a cyclic carbonate compound, a nitrile compound, an isocyanate compound, a C≡C group-containing compound, an SO group-containing compound, a phosphorus-containing compound, an acid anhydride, a cyclic phosphazene compound, a boron-containing compound, and a silicon-containing compound.

Examples of the cyclic carbonate compound include 4-fluoro-1,3-dioxolan-2-one (FEC), trans- or cis-4,5-difluoro-1,3-dioxolan-2-one (DFEC), vinylene carbonate (VC), vinyl ethylene carbonate (VEC), and 4-ethynyl-1,3- dioxolan-2-one (EEC). As the cyclic carbonate compound, VC, FEC, VEC, or a combination thereof may be used.

Examples of the nitrile compound include acetonitrile, propionitrile, succinonitrile, glutaronitrile, adiponitrile, pimelonitrile, suberonitrile, and sebaconitrile. As the nitrile compound, succinonitrile, adiponitrile, or a combination thereof may be used.

Examples of the isocyanate compound include methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

Examples of the C≡C group-containing compound include 2-propynyl methyl carbonate, 2-propynyl acetate, 2-propynyl formate, 2-propynyl methacrylate, 2-propynyl methanesulfonate, 2-propynyl vinyl sulfonate, 2-propynyl 2-(methanesulfonyloxy)propionate, di(2-propynyl)oxalate, methyl-2-propynyl oxalate, ethyl-2-propynyl oxalate, di(2-propynyl) glutarate, 2-butyne-1,4-diyldimethanesulfonate, 2-butyne-1,4-diyldiformate, and 2,4-hexadiyne-1,6-diyldimethanesulfonate.

Examples of the SO group-containing compound include sultones such as 1,3-propanesultone (PS), 1,3-butanesultone, 2,4-butanesultone, 1,4-butanesultone, 1,3-propenesultone, 2,2-dioxide-1,2-oxathiolan-4-yl acetate, and 5,5-dimethyl-1,2-oxathiolan-4-one 2,2-dioxide, cyclic sulfites such as ethylene sulfite, ethylene sulfate, hexahydrobenzo[1,3,2]dioxathiolan-2-oxide (also referred to as 1,2-cyclohexanediolcyclic sulfite), and 5-vinyl-hexahydro-1,3,2-benzodioxathiol-2-oxide, sulfonic acid esters such as butane-2,3-diyldimethanesulfonate, butane-1,4-diyldimethanesulfonate, methylenemethanedisulfonate, and 1,3-propanedisulfonic acidanhydride, divinylsulfone, 1,2-bis(vinylsulfonyl)ethane, and bis(2-vinylsulfonylethyl) ether.

Examples of the phosphorus-containing compound include trimethyl phosphate, tributyl phosphate, and trioctyl phosphate, tris(2,2,2-trifluoroethyl) phosphate, bis(2,2,2-trifluoroethyl)methyl phosphate, bis(2,2,2-trifluoroethyl)ethyl phosphate, bis(2,2,2-trifluoroethyl)2,2-difluoroethyl phosphate, bis(2,2,2-trifluoroethyl)2,2,3,3-tetrafluoropropyl phosphate, bis(2,2-difluoroethyl)2,2,2-trifluoroethyl phosphate, bis(2,2,3,3-tetrafluoropropyl)2,2,2-trifluoroethyl phosphate, and (2,2,2-trifluoroethyl)2,2,3,3-tetrafluoropropyl)methyl phosphate, tris(1,1,1,3,3,3-hexafluoropropan-2-yl) phosphate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl) acetate, methyl 2-(diethoxyphosphoryl)acetate, ethyl 2-(diethoxyphosphoryl) acetate, 2-propynyl 2-(dimethoxyphosphoryl) acetate, 2-propynyl 2-(diethoxyphosphoryl) acetate, methyl pyrophosphate, and ethyl pyrophosphate.

Examples of the acid anhydride include acetic anhydride, propionic anhydride, succinic anhydride, maleic anhydride, 3-allyl succinic anhydride, glutaric anhydride, itaconic anhydride, and 3-sulfo-propionic anhydride.

Examples of the cyclic phosphazene compound include methoxypentafluorocyclotriphosphazene, ethoxypentafluorocyclotriphosphazene, phenoxypentafluorocyclotriphosphazene, and ethoxyheptafluorocyclotetraphosphazene.

Examples of the silicon-containing compound include, hexamethylcyclotrisiloxane, hexaethylcyclotrisiloxane, hexaphenylcyclotrisiloxane, 1,3,5-trimethyl-1,3,5-trivinylcyclotrisiloxane, octamethylcyclotetrasiloxane, decamethylcyclopentasiloxane, trimethylfluorosilane, triethylfluorosilane, tripropylfluorosilane, phenyldimethylfluorosilane, triphenylfluorosilane, vinyldimethylfluorosilane, vinyldiethylfluorosilane, vinyldiphenylfluorosilane, trimethoxyfluorosilane, triethoxyfluorosilane, dimethyldifluorosilane, diethyldifluorosilane, divinyldifluorosilane, ethylvinyldifluorosilane, methyltrifluorosilane, ethyltrifluorosilane, hexamethyldisiloxane, 1,3-diethyltetramethyldisiloxane, hexaethyldisiloxane, octamethyltrisiloxane, methoxytrimethylsilane, ethoxytrimethylsilane, dimethoxydimethylsilane, trimethoxymethylsilane, tetramethoxysilane, bis(trimethylsilyl)peroxide, trimethylsilyl acetate, triethylsilyl acetate, trimethylsilyl propionate, trimethylsilyl methacrylate, trimethylsilyl trifluoroacetate, trimethylsilyl methanesulfonate, trimethylsilyl ethanesulfonate, triethylsilyl methanesulfonate, trimethylsilyl fluoromethanesulfonate, bis(trimethylsilyl) sulfate, tris(trimethylsiloxy) boron, tris(trimethylsilyl) phosphate, and tris(trimethylsilyl) phosphite.

Examples of the boron-containing compound include boroxine, trimethylboroxine, trimethoxyboroxine, triethylboroxine, triethoxyboroxine, tri-isopropylboroxine, tri-isopropoxyboroxine, tri-n-propylboroxine, tri-n-propoxyboroxine, tri-n-butylboroxine, tri-n-butyronitrile alkoxyboroxine, triphenylboroxine, triphenoxyboroxine, tricyclohexylboroxine and tricyclohexoxyboroxine.

The nonaqueous electrolyte solution according to the present embodiment contains the additive for nonaqueous electrolyte solutions, a nonaqueous solvent, and an electrolyte. The content of the additive (or the compound represented by the formula (1)) for nonaqueous electrolyte solutions in the nonaqueous electrolyte solution may be 0.005% to 10% by mass in terms of a total amount based on the total mass of the nonaqueous electrolyte solution. In a case where the content of the additive for nonaqueous electrolyte solutions is 0.005% by mass or more, more excellent battery characteristics can be obtained, and in a case where the content is 10% by mass or less, the viscosity of the nonaqueous electrolyte solution is not likely to increase, whereby ion mobility can be sufficiently secured. From the same viewpoint, the content of the additive (or the compound represented by the formula (1)) for nonaqueous electrolyte solutions may be in the range of 0.01% to 10% by mass in terms of a total amount based on the total mass of the nonaqueous electrolyte solution.

In a case where the compound represented by the formula (1) and the cyclic carbonate compound are used in combination, the content of the cyclic carbonate compound may be 0.001% to 10% by mass with respect to the total mass of the nonaqueous electrolyte solution. In a case where the content of the cyclic carbonate compound is within this range, the SEI does not become too thick and the stability of the SEI at a higher temperature is increased. The content of the cyclic carbonate compound may be 0.01% by mass or more, or 0.5% by mass or more, with respect to the total mass of the nonaqueous electrolyte solution.

In a case where the compound represented by the formula (1) and the nitrile compound are used in combination, the content of the nitrile compound may be 0.001% to 10% by mass with respect to the total mass of the nonaqueous electrolyte solution. In a case where the content of the nitrile compound is within this range, the SEI does not become too thick and the stability of SEI at a higher temperature is increased. The content of the nitrile compound may be 0.01% by mass or more, or 0.5% by mass or more, with respect to the total mass of the nonaqueous electrolyte solution.

In a case where the compound represented by the formula (1) and the isocyanate compound are used in combination, the content of the isocyanate compound may be 0.01% to 5% by mass, with respect to the total mass of the nonaqueous electrolyte solution. In a case where the content of the isocyanate compound is within this range, the SEI does not become too thick and the stability of the SEI at a higher temperature is increased. In a case where the content of the isocyanate compound may be 0.5% by mass or more, or 3% by mass or less, with respect to the total mass of the nonaqueous electrolyte solution.

In a case where the compound represented by the formula (1) and the C≡C group-containing compound are used in combination, the content of the C≡C group-containing compound may be 0.01% to 5% by mass with respect to the total mass of the nonaqueous electrolyte solution. In a case where the content of the C≡C group-containing compound is within this range, the SEI does not become too thick, and the stability of the SEI at a higher temperature is increased. The content of the C≡C group-containing compound is 0.1% by mass or more, with respect to the total mass of the nonaqueous electrolyte solution.

In a case where the compound represented by the formula (1) and the SO group-containing compound are used in combination, the content of the SO group-containing compound may be 0.001% to 5% by mass, with respect to the total mass of the nonaqueous electrolyte solution. In a case where the content of the SO group-containing compound is within this range, the SEI does not become too thick, and the stability of the SEI at a higher temperature is increased. The content of the SO group-containing compound may be 0.01% by mass or more, or 0.1% by mass or more, with respect to the total mass of the nonaqueous electrolyte solution.

In a case where the compound represented by the formula (1) and the phosphorus-containing compound are used in combination, the phosphorus-containing compound may be 0.001% to 5% by mass, with respect to the total mass of the nonaqueous electrolyte solution. In a case where the content of the phosphorus-containing compound is within this range, the SEI does not become too thick, and the stability of the SEI at a higher temperature is increased. The content of the phosphorus-containing compound may be 0.01% by mass or more, or 0.1% by mass or more, with respect to the total mass of the nonaqueous electrolyte solution.

In a case where the compound represented by the formula (1) and the cyclic phosphazene compound are used in combination, the cyclic phosphazene compound may be 0.001% to 5% by mass with respect to the total mass of the nonaqueous electrolyte solution. In a case where the content of the cyclic phosphazene compound is within this range, the SEI does not become too thick, and the stability of the SEI at a higher temperature is increased. The content of the cyclic phosphazene compound may be 0.01% by mass or more, or 0.1% by mass or more, with respect to the total mass of the nonaqueous electrolyte solution.

In a case where the compound represented by the formula (1) and the acid anhydride are used in combination, the acid anhydride may be 0.001% to 5% by mass with respect to the total mass of the nonaqueous electrolyte solution. In a case where the content of the acid anhydride is within this range, the SEI does not become too thick, and the stability of the SEI at a higher temperature is increased. The content of the acid anhydride may be 0.01% by mass or more, or 0.5% by mass or more, with respect to the total mass of the nonaqueous electrolyte solution.

In a case where the compound represented by the formula (1) and the boron-containing compound are used in combination, the boron-containing compound may be 0.001% to 5% by mass with respect to the total mass of the nonaqueous electrolyte solution. In a case where the content is within this range, the SEI does not become too thick, and the stability of the SEI at a higher temperature is increased. The content of the boron-containing compound may be 0.01% by mass or more, or 0.1% by mass or more, with respect to the total mass of the nonaqueous electrolyte solution.

In a case where the compound represented by the formula (1) and the silicon-containing compound are used in combination, the silicon-containing compound may be 0.01% to 5% by mass with respect to the total mass of the nonaqueous electrolyte solution. In a case where the content of the silicon-containing compound is within this range, the SEI does not become too thick, and the stability of the SEI at a higher temperature is increased. The content of the silicon-containing compound may be 0.1% by mass or more, or 0.5% by mass or more, with respect to the total mass of the nonaqueous electrolyte solution.

From the viewpoints that the viscosity of the nonaqueous electrolyte solution thus obtained is suppressed to a lower value, an aprotic solvent can be selected as the nonaqueous solvent. The aprotic solvent may be at least one selected from the group consisting of a cyclic carbonate, a chained carbonate, an aliphatic carboxylic acid ester, a lactone, a lactam, a cyclic ether, a chained ether, a sulfone, a nitrile, and a halogen derivative thereof. As the aprotic solvent, the cyclic carbonate or the chained carbonate can be selected from, and a combination of the cyclic carbonate and the chained carbonate can also be selected as the aprotic solvent.

Examples of the cyclic carbonate include ethylene carbonate, propylene carbonate, butylene carbonate, and FEC. Examples of the chained carbonate include dimethyl carbonate, diethyl carbonate, and ethyl methyl carbonate. Examples of the aliphatic carboxylic acid ester include methyl acetate, ethyl acetate, methyl propionate, ethyl propionate, methyl butyrate, methyl isobutyrate, and methyl trimethylacetate. Examples of the lactone include γ-butyrolactone. Examples of the lactam include ε-caprolactam and N-methylpyrrolidone. Examples of the cyclic ether include tetrahydrofuran, 2-methyltetrahydrofuran, tetrahydropyran, and 1,3-dioxolane. Examples of the chained ether include 1,2-diethoxyethane and ethoxymethoxyethane. Examples of the sulfone include sulfolane. Examples of the nitrile include acetonitrile. Examples of the halogen derivative include 4-fluoro-1,3-dioxolan-2-one, 4-chloro-1,3-dioxolan-2-one, and 4,5-difluoro-1,3-dioxolan-2-one. These nonaqueous solvents may be used alone or in combination of two or more kinds thereof.

The electrolyte may be a lithium salt which serves as an ion source of lithium ions. The electrolyte may be at least one selected from the group consisting of $LiAlCl_4$, $LiBF_4$, $LiPF_6$, $LiClO_4$, $LiAsF_6$, and $LiSbF_6$. As the electrolyte, $LiBF_4$ and/or $LiPF_6$ may be selected from the viewpoints that they can increase the ion conductivity of the electrolyte solution and have an action of suppressing deterioration of the performance of an electricity storage device by a long-term use due to their oxidation-reduction resistance characteristics. These electrolytes may be used alone or in combination of two or more kinds thereof.

In a case where the electrolyte is $LiBF_4$ and/or $LiPF_6$, one or more of each of cyclic carbonates and chained carbonates may be combined as the nonaqueous solvent. In particular, $LiBF_4$ and/or $LiPF_6$, ethylene carbonate, and diethyl carbonate may be combined.

The concentration of the electrolyte in the nonaqueous electrolyte solution may be 0.1 to 2.0 mol/L with respect to the volume of the nonaqueous electrolyte solution. In a case where the concentration of the electrolyte is 0.1 mol/L or more, more excellent discharge characteristics, charge characteristics, or the like are obtained. In a case where the concentration of the electrolyte is 2.5 mol/L or less, it is difficult for the viscosity of the nonaqueous electrolyte solution to be increased, whereby ion mobility can be sufficiently secured. From the same viewpoint, the concentration of the electrolyte may be 0.3 to 2.0 mol/L, or 0.5 mol/L to 1.6 mol/L.

In the nonaqueous electrolyte solution according to the present embodiment, a second lithium salt that is different from the electrolyte (first lithium salt) may also be used in combination. Examples of the second lithium salt include lithium difluorophosphate, lithium bisoxalatoborate (LiBOB), lithium tetrafluoro(oxalato)phosphate (LiTFOP), lithium difluorooxalatoborate (LiDFOB), lithium difluorobisoxalatophosphate (LiDFOP), lithium tetrafluoroborate, lithium bisfluorosulfonylimide, and $Li_2PO_3F$; and lithium salts having an S(=O) group, such as lithium trifluoro((methanesulfonyl)oxy) borate, lithium pentafluoro((methanesulfonyl)oxy) phosphate, lithium methyl sulfate, lithium methyl sulfate, lithium 2,2,2-trifluoroethyl sulfate, and lithium fluorosulfonate. The second lithium salt may include one or more lithium salts selected from the group consisting of lithium difluorophosphate, lithium bisoxalatoborate, lithium tetrafluoro(oxalato)phosphate, lithiumdifluorooxalate borate, lithium difluorobisoxalate phosphate, lithium methyl sulfate, lithium methyl sulfate, and lithium fluorosulfonate.

The concentration of the second lithium salt in the nonaqueous electrolyte solution is 0.001 to 1.0 mol/L with respect to the volume of the nonaqueous electrolyte solution. In a case where the concentration of the second lithium salt is 0.001 mol/L or more, more excellent charge/discharge characteristics are obtained under a high-temperature condition. In a case where the concentration of the second lithium salt is 1.0 mol/L or less, it is difficult for the viscosity of the nonaqueous electrolyte solution to be increased, the ion mobility can be sufficiently secured. From the same viewpoint, the concentration of the second lithium salt may be 0.01 to 0.8 mol/L, or may be 0.01 to 0.5 mol/L.

The nonaqueous electrolyte solution according to the present embodiment is prepared by adding an additive for nonaqueous electrolyte solutions, including the compound represented by the formula (1), an electrolyte, and a common additive to be added as desire to a nonaqueous solvent.

The nonaqueous electrolyte solution according to the present embodiment can be used as an electrolyte solution of an electricity storage device including a positive electrode and a negative electrode. More specifically, in a case where a nonaqueous electrolyte solution prepared using the additive for nonaqueous electrolyte solutions according to the present embodiment is used in a nonaqueous electrolyte solution secondary battery such as a lithium ion battery and a electricity storage device such as an electric double layer capacitor such as a lithium ion capacitor, battery characteristics such as initial resistance, discharge capacity retention rate, and suppression of a long-term increase in resistance can be improved. Further, from the viewpoint that the additive for nonaqueous electrolyte solutions according to the present embodiment is stabilized in the nonaqueous electrolyte solution, generation of gases such as carbon dioxide due to the decomposition on the positive electrode due to the charge can be suppressed to improve battery performance and safety.

The electricity storage device according to the present embodiment is mainly constituted with the nonaqueous electrolyte solution, a positive electrode, and a negative electrode. Specific examples of the electricity storage device include nonaqueous electrolyte solution secondary batteries (a lithium ion battery and the like) and electric double layer capacitors (a lithium ion capacitor and the like). The nonaqueous electrolyte solution according to the present embodiment is particularly effective in applications involving a lithium ion battery and a lithium ion capacitor.

FIG. 1 is a cross-sectional view schematically showing one example of a nonaqueous electrolyte solution secondary battery as the electricity storage device according to the present embodiment. In FIG. 1, a nonaqueous electrolyte solution secondary battery 1 includes a positive electrode plate 4 (positive electrode) and a negative electrode plate 7 (negative electrode), and a nonaqueous electrolyte solution 8 disposed between the positive electrode plate 4 and the negative electrode plate 7, and a separator 9 provided in the nonaqueous electrolyte solution 8. The positive electrode plate 4 has a positive electrode collector 2 and a positive electrode active material layer 3 provided on the side of the nonaqueous electrolyte solution 8. The negative electrode plate 7 has a negative electrode collector 5 and a negative electrode active material layer 6 provided on the side of the nonaqueous electrolyte solution 8. As the nonaqueous electrolyte solution 8, the nonaqueous electrolyte solution according to the above-mentioned embodiment can be used. Although FIG. 1 shows a nonaqueous electrolyte solution secondary battery as the electricity storage device, the electricity storage device to which the nonaqueous electrolyte solution can be applied is not limited thereto, and it may be another electricity storage device such as an electric double layer capacitor.

As the positive electrode collector 2 and the negative electrode collector 5, for example, a metal foil formed of a metal such as aluminum, copper, nickel, and stainless steel can be used.

The positive electrode active material layer 3 includes a positive electrode active material. The positive electrode active material may be a lithium-containing composite oxide. Examples of the lithium-containing composite oxide include lithium-containing composite oxides such as $LiMnO_2$, $LiFeO_2$, $LiCoO_2$, $LiMn_2O_4$, $Li_2FeSiO_4$, $LiNi_{1/3}Co_{1/3}Mn_{1/3}$, $LiNi_{0.5}Co_{0.2}Mn_{0.3}$, $LiNi_{0.6}Co_{0.2}Mn_{0.2}$, $LiNi_{0.8}Co_{0.1}Mn_{0.1}$, $LiNi_xCo_yM_zO_2$ (provided that $0.01<x<1$, $0 \le y \le 1$, $0 \le z \le 1$, and $x+y+z=1$ are satisfied, and M is at least one element selected from the group consisting of Mn, V, Mg, Mo, Nb, Fe, Cu, and Al), and $LiFePO_4$.

The negative electrode active material layer 6 includes a negative electrode active material. The negative electrode active material may be, for example, a material capable of absorbing and releasing lithium. Examples of such a material include a carbon material such as crystalline carbon (natural graphite, artificial graphite, and the like), amorphous carbon, carbon-coated graphite, and resin-coated graphite, an oxide material such as indium oxide, silicon oxide, tin oxide, lithium titanate, zinc oxide, and lithium oxide, and a metal material such as a lithium metal and a metal capable of forming an alloy together with lithium. Examples of the metal capable of forming an alloy together with lithium include Cu, Sn, Si, Co, Mn, Fe, Sb, and Ag, and a binary or ternary alloy including any of these metals and lithium can also be used as the negative electrode active material. These negative electrode active materials may be used alone or in mixture of two or more kinds thereof.

From the viewpoint of achieving a higher energy density, a carbon material such as graphite and an Si-based active material such as Si, an Si alloy, and an Si oxide may be combined. From the viewpoint of achieving both of the cycle characteristics and the higher energy density, graphite and the Si-based active material may be combined. With regard to such a combination, the mass ratio of the Si-based active material to the total mass of the carbon material and the Si-based active material may be from 0.5% by mass to 95% by mass, from 1% by mass to 50% by mass, or from 2% by mass to 40% by mass.

The positive electrode active material layer 3 and the negative electrode active material layer 6 may further include a binder. Examples of the binder include polyvinylidene difluoride (PVDF), a vinylidene fluoride-hexafluoropropylene copolymer, a vinylidene fluoride-tetrafluoroethylene copolymer, a styrene-butadiene copolymerized rubber, carboxymethyl cellulose, polytetrafluoroethylene, polypropylene, polyethylene, polyimide, polyamideimide, polyacrylic acid, polyvinyl alcohol, acrylic acid-polyacrylonitrile, polyacrylamide, polymethacrylic acid, and a copolymer thereof. The binders may be the same or different in the positive electrode active material layer and the anode active material layer.

The positive electrode active material layer 3 and the negative electrode active material layer 6 may further include a conductive auxiliary material for the purpose of lowering the resistance. Examples of the conductive auxiliary material include carbonaceous fine particles such as graphite, carbon black, acetylene black, and Ketjen black, and carbon fibers.

As the separator 9, for example, a single-layer or laminate porous film formed of polyethylene, polypropylene, a fluorine resin, or the like, or a woven fabric or nonwoven fabric porous film can be used.

Specific forms such as a shape and a thickness of each of members constituting the electricity storage device can be set as appropriate by those skilled in the art. The configurations of the electricity storage device are not limited to the embodiment of FIG. 1, and modifications may be made as appropriate.

EXAMPLES

Hereinafter, the present invention will be described in more detail with reference to Examples.

Preparation of Nonaqueous Electrolyte Solution

Example 1

1. Synthesis of 4-Methylsulfonyloxytetrahydrothiophene-1,1-dioxid-2-ene (Compound 1)

50 mL of water was introduced into a 300-mL four-necked flask equipped with a stirrer, a condenser, a thermometer, and a dropping funnel, and 3-sulfolene (11.8 g, 100 mmol) and N-bromosuccinimide (18.0 g, 100 mmol) were added thereto under ice-cooling. Subsequently, the reaction solution in the flask was warmed to 80° C., and then stirred for 5 hours while maintaining the same temperature. Thereafter, the flask was cooled in an ice bath, then 50 mL of tetrahydrofuran (THF) was added thereto, and pyridine (11.1 g, 140 mmol) were added dropwise to the mixture. After completion of dropwise addition, the reaction solution was stirred for 2 hours under ice-cooling, and the precipitated solid was separated by filtration. The solvent was distilled off from the filtrate to obtain 4-hydroxy-2-sulfolene (6.8 g, a yield of 51% with respect to 3-sulfolene). The molecular weight of the product was confirmed to be 134 by means of an LC/MS spectrum.

Next, 50 mL of acetonitrile was introduced into a 300-mL four-necked flask equipped with a stirrer, a condenser, a thermometer, and a dropping funnel under ice-cooling, and the obtained 4-hydroxy-2-sulfolene (6.8 g, 50 mmol) was added thereto. Methanesulfonyl chloride (50 mmol, 5.7 g) was added dropwise to the mixture under ice-cooling and the reaction solution was stirred for 12 hours under ice-cooling. Thereafter, water was added thereto, the precipitate was filtered, and then after performing repulping with methyl-tert-butyl ether (MTBE), and the filtrate was dried under reduced pressure to obtain compound 1 (5.3 g, a yield of 50% with respect to 4-hydroxy-2-sulfolene) shown in Table 1. The molecular weight of the product was confirmed to be 212 by means of an LC/MS spectrum.

2. Preparation of Electrolyte Solution

Ethylene carbonate (EC) and diethyl carbonate (DEC) were mixed at a compositional volume ratio of EC:DEC=30: 70 to obtain a nonaqueous mixed solvent. $LiPF_6$ as an electrolyte was dissolved in the resulting nonaqueous mixed solvent to a concentration of 1.0 mol/L. The compound 1 (4-methylsulfonyloxytetrahydrothiophene-1,1-dioxid-2-ene) as the additive for nonaqueous electrolyte solutions was added to the obtained solution to prepare a nonaqueous electrolyte solution. The content of the additive (compound 1) for nonaqueous electrolyte solutions was set to 1.0% by mass with respect to the total mass of the nonaqueous electrolyte solution.

Example 2

1. Synthesis of 4-Methoxycarbonyloxytetrahydrothiophene-1,1-dioxid-2-ene (Compound 2)

The reaction was carried out in the same manner as in Example 1, except that methanesulfonyl chloride in Example 1 was changed to methyl chloroformate (4.7 g, 50 mmol), to obtain a compound 2 (6.2 g, a yield of 65% with respect to 4-hydroxy-2-sulfolene) shown in Table 1. The molecular weight of the product was confirmed to be 192 by means of an LC/MS spectrum.

2. Preparation of Electrolyte Solution

A nonaqueous electrolyte solution was prepared in the same manner as in Example 1, except that the compound 2 was used instead of the compound 1 in 2. of Example 1.

Example 3

1. Synthesis of 4-Diethoxyphosphinyloxytetrahydrothiophene-1,1-dioxid-2-ene (Compound 3)

The reaction was carried out in the same manner as in Example 1, except that methanesulfonyl chloride in Example 1 was changed to diethylphosphoryl chloride (8.6 g, 50 mmol), to obtain a compound 3 (5.7 g, a yield of 42% with respect to 4-hydroxy-2-sulfolene) shown in Table 1. The molecular weight of the product was confirmed to be 270 by means of an LC/MS spectrum.

2. Preparation of Electrolyte Solution

A nonaqueous electrolyte solution was prepared in the same manner as in Example 1, except that the compound 3 was used instead of the compound 1 in 2. of Example 1.

Example 4

1. Synthesis of 4-Phenylsulfonyloxytetrahydrothiophene-1,1-dioxid-2-ene (Compound 4)

The reaction was carried out in the same manner as in Example 1, except that methanesulfonyl chloride in Example 1 was changed to phenylsulfonyl chloride (8.8 g, 50 mmol), to obtain a compound 4 (8.0 g, a yield of 58% with respect to 4-hydroxy-2-sulfolene) shown in Table 1. The molecular weight of the product was confirmed to be 274 by means of an LC/MS spectrum.

2. Preparation of Electrolyte Solution

A nonaqueous electrolyte solution was prepared in the same manner as in Example 1, except that the compound 4 was used instead of the compound 1 in 2. of Example 1.

Example 5

1. Synthesis of 4-Trifluoromethylsulfonyloxytetrahydrothiophene-1,1-dioxid-2-ene (Compound 5)

The reaction was carried out in the same manner as in Example 1, except that methanesulfonyl chloride in Example 1 was changed to trifluoromethanesulfonyl chloride (8.4 g, 50 mmol), to obtain a compound 5 (6.2 g, a yield of 65% with respect to 4-hydroxy-2-sulfolene) shown in Table 1. The molecular weight of the product was confirmed to be 266 by means of an LC/MS spectrum.

2. Preparation of Electrolyte Solution

A nonaqueous electrolyte solution was prepared in the same manner as in Example 1, except that the compound 5 was used instead of the compound 1 in 2. of Example 1.

Example 6

1. Synthesis of 4-Allylsulfonyloxytetrahydrothiophene-1,1-dioxid-2-ene (Compound 6)

The reaction was carried out in the same manner as in Example 1, except that methanesulfonyl chloride in Example 1 was changed to allylsulfonyl chloride (7.0 g, 50 mmol), to obtain a compound 6 (4.7 g, a yield of 40% with respect to 4-hydroxy-2-sulfolene) shown in Table 1. The molecular weight of the product was confirmed to be 236 by means of an LC/MS spectrum.

2. Preparation of Electrolyte Solution

A nonaqueous electrolyte solution was prepared in the same manner as in Example 1, except that the compound 6 was used instead of the compound 1 in 2. of Example 1.

Comparative Example 1

A nonaqueous electrolyte solution was prepared in the same manner as in Example 1, except that the compound 1 was not used in 2. of Example 1.

Comparative Example 2

A nonaqueous electrolyte solution was prepared in the same manner as in Example 1, except that 1,3-propanesultone (PS, manufactured by Tokyo Chemical Industry Co., Ltd.) was used instead of the compound 1 in 2. of Example 1.

Comparative Example 3

A nonaqueous electrolyte solution was prepared in the same manner as in Example 1, except that vinylene carbonate (VC, manufactured by Tokyo Chemical Industry Co., Ltd.) was used instead of the compound 1 in 2. of Example 1.

Comparative Example 4

A nonaqueous electrolyte solution was prepared in the same manner as in Comparative Example 3, except that the content of vinylene carbonate (VC) was set to 2.0% by mass.

Comparative Example 5

A nonaqueous electrolyte solution was prepared in the same manner as in Example 1, except that fluoroethylene carbonate (FEC, manufactured by Tokyo Chemical Industry Co., Ltd.) was used instead of the compound 1 in 2. of Example 1.

Comparative Example 6

A nonaqueous electrolyte solution was prepared in the same manner as in Comparative Example 5, except that the content of fluoroethylene carbonate (FEC) was set to 2.0% by mass.

TABLE 1

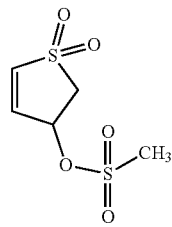

Cpd. 1

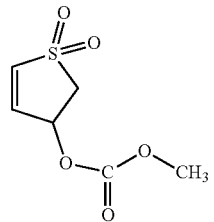

Cpd. 2

TABLE 1-continued

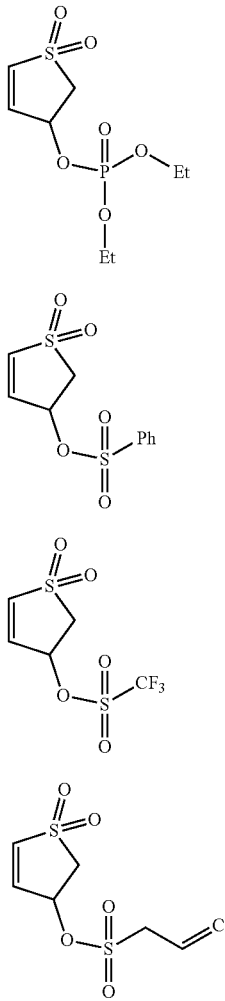

Cpd. 3

Cpd. 4

Cpd. 5

Cpd. 6

Evaluation

Fabrication of Nonaqueous Electrolyte Solution Secondary Battery $LiNi_{0.5}Co_{0.2}Mn_{0.3}O_2$ as a positive electrode active material and carbon black as an electrical conductivity-imparting agent were dry-mixed. The obtained mixture was uniformly dispersed in N-methyl-2-pyrrolidone (NMP) in which polyvinylidene difluoride (PVDF) as a binder had been dissolved, thereby preparing a slurry. The obtained slurry was applied to both surfaces of an aluminum metal foil (rectangular, a thickness of 20 μm). The coating film was dried to remove NMP, and the whole film was pressed to obtain a positive electrode sheet having the aluminum metal foil as a positive electrode collector and positive electrode active material layers formed on both surfaces of the foil. The ratio of the solid contents in the obtained positive electrode sheet was set to positive electrode active material:electrical conductivity-imparting agent:PVDF=92:5:3 in terms of a mass ratio.

Graphite powder as a negative electrode active material and a carbon black as a conductivity-imparting agent were dry-mixed. The obtained mixture, a styrene-butadiene rubber (SBR) as a binder, and carboxymethyl cellulose (CMC) as a thickener were uniformly dispersed in water, thereby preparing a slurry. The obtained slurry was applied to one surface of a copper foil (rectangular, a thickness of 10 μm). The coating film was dried to remove water therefrom, and the whole film was pressed to obtain a negative electrode sheet having the copper foil as a negative electrode collector and a negative electrode active material layer formed on one surface of the foil. The ratio of the solid contents in the obtained negative electrode sheet was set to negative electrode active material:CMC:SBR=98:1:1 in terms of a mass ratio.

A negative electrode sheet, a separator formed of polyethylene, a positive electrode sheet, a separator formed of polyethylene, and a negative electrode sheet were laminated in this order to fabricate a battery element. This battery element was put in a bag formed of a laminated film having aluminum (thickness: 40 μm) and resin layers coating both sides thereof in such a way that the terminals of the positive electrode sheet and the negative electrode sheet protruded from the bag. Subsequently, each of the nonaqueous electrolyte solutions obtained in Examples and Comparative Examples was poured into the bag. The bag was vacuum-sealed to obtain a sheet-shaped nonaqueous electrolyte solution battery. Further, in order to increase the adhesiveness between the electrodes, the sheet-shaped nonaqueous electrolyte solution secondary battery was sandwiched between glass plates and pressurized to fabricate a nonaqueous electrolyte solution secondary battery (sheet-formed secondary battery).

Evaluation of Initial Resistance Ratio

Each of the obtained nonaqueous electrolyte solution secondary batteries was charged to 4.2 V at a current corresponding to 0.2 C in an environment of 25° C., and then subjected to aging by keeping the battery in an environment of 45° C. for 24 hours. Thereafter, the nonaqueous electrolyte solution secondary battery was discharged to 3 V at a current corresponding to 0.2 C in an environment of 25° C. Subsequently, the nonaqueous electrolyte solution secondary battery was subjected to repetition of three cycles of an operation of charging to 4.2 V at a current corresponding to 0.2 C and discharging to 3 V at a current corresponding to 0.2 C, thereby stabilizing the battery. Thereafter, an initial charge/discharge in which charge/discharge is performed at a current corresponding to 1 C was performed, at which a discharge capacity was measured. The obtained value was defined as an "initial capacity".

In addition, with regard to the nonaqueous electrolyte solution secondary battery that had been charged to a capacity of 50% out of the initial capacity after the initial charge/discharge, an AC impedance at 25° C. was measured and the obtained value was defined as an initial resistance (Ω). Table 2 shows the initial resistance ratio in each of the batteries. The "initial resistance ratio" is a relative value of the resistance of each nonaqueous electrolyte solution secondary battery in a case where the initial resistance (Ω) of Comparative Example 1 was taken as 1.

Evaluation of Discharge Capacity Retention Rate and Resistance Increase Rate

With regard to each of the nonaqueous electrolyte solution secondary batteries after the initial charge/discharge, 200 cycles of charge/discharge cycle tests were carried out at a charge rate of 1 C, a discharge rate of 1 C, a charge cut-off voltage of 4.2 V, and a discharge cut-off voltage of 3 V. Thereafter, charge/discharge was performed at a current corresponding to 1 C, at which a discharge capacity was measured. The obtained value was defined as a "capacity after cycles".

In addition, with regard to the nonaqueous electrolyte solution secondary battery that had been charged to a capacity out of 50% of the capacity after cycles after the above-mentioned cycle test, an AC impedance in an environment of 25° C. was measured and the obtained value was defined as a resistance (Ω) after cycles. Table 2 shows the discharge capacity retention rate and the resistance increase rate in each of the batteries. In Table 1, "Discharge capacity retention rate" is calculated as (capacity after cycles)/(initial capacity), and "Resistance increase rate" is calculated as (resistance after cycles)/(initial resistance).

Evaluation of Gas Generation

Apart from the batteries used for evaluation of the initial resistance, and evaluation of the discharge capacity retention rate and the resistance increase rate, a nonaqueous electrolyte solution secondary battery having the same configuration including each of the electrolyte solutions of Examples and Comparative Examples was prepared. This nonaqueous electrolyte solution secondary battery was charged to 4.2 V at a current corresponding to 0.2 C in an environment of 25° C., and subjected to aging in an environment of 45° C. for 24 hours. Thereafter, the nonaqueous electrolyte solution secondary battery was discharged to 3 V at a current corresponding to 0.2 C in an environment of 25° C. Subsequently, the nonaqueous electrolyte solution secondary battery was subjected to repetition of three cycles of an operation of charging to 4.2 V at a current corresponding to 0.2 C and discharging to 3 V at a current corresponding to 0.2 C, thereby stabilizing the battery. With regard to the nonaqueous electrolyte solution secondary battery after the initial charge/discharge, the volume of the battery was measured by an Archimedes' method and was defined as an "initial volume ($cm^3$) of the battery".

In addition, the nonaqueous electrolyte solution secondary battery was charged to 4.2 V at a current corresponding to 1 C in an environment of 25° C., and then kept in an environment of 60° C. for 168 hours. Thereafter, the nonaqueous electrolyte solution secondary battery was cooled to 25° C. and discharged to 3 V at a current corresponding to 1 C. With regard to the nonaqueous electrolyte solution secondary battery, the volume of the battery was measured by the Archimedes' method and the obtained value was defined as a "volume ($cm^3$) of the battery after storage at a high temperature". Further, by calculating (volume ($cm^3$) after storage at high temperature)−(initial volume), an "amount of gas generated" was determined. The amount of gas generated in each of the batteries is shown in Table 2.

TABLE 2

| | Additive | Concentration (% by mass) | Initial resistance ratio | Discharge capacity retention rate (%) | Resistance increase rate (%) | Amount ($cm^3$) of gas generated |
|---|---|---|---|---|---|---|
| Ex. 1 | Cpd. 1 | 1.0 | 0.65 | 93 | 1.3 | 0.12 |
| Ex. 2 | Cpd. 2 | 1.0 | 0.78 | 92 | 1.3 | 0.18 |
| Ex. 3 | Cpd. 3 | 1.0 | 0.68 | 91 | 1.2 | 0.13 |
| Ex. 4 | Cpd. 4 | 1.0 | 0.79 | 91 | 1.2 | 0.11 |
| Ex. 5 | Cpd. 5 | 1.0 | 0.64 | 94 | 1.1 | 0.12 |
| Ex. 6 | Cpd. 6 | 1.0 | 0.88 | 95 | 1.4 | 0.12 |
| Comp. Ex. 1 | — | — | 1 | 85 | 1.5 | 0.38 |
| Comp. Ex. 2 | PS | 1.0 | 0.86 | 89 | 1.3 | 035 |
| Comp. Ex. 3 | VC | 1.0 | 1.18 | 89 | 1.4 | 0.30 |
| Comp. Ex. 4 | VC | 2.0 | 1.59 | 91 | 1.3 | 0.27 |
| Comp. Ex. 5 | FEC | 1.0 | 0.88 | 88 | 1.4 | 0.44 |
| Comp. Ex. 6 | FEC | 2.0 | 0.89 | 88 | 1.4 | 0.49 |

REFERENCE SIGNS LIST

1: Nonaqueous electrolyte solution secondary battery (electricity storage device), 2: Positive electrode collector, 3: Positive electrode active material layer, 4: Positive electrode plate, 5: Negative electrode collector, 6: Negative electrode active material layer, 7: Negative electrode plate, 8: Nonaqueous electrolyte solution, and 9: Separator.

The invention claimed is:

1. An additive for nonaqueous electrolyte solutions, comprising a compound represented by the following formula (1):

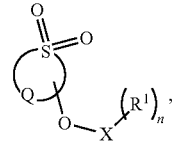

(1)

wherein in the formula (1),
Q represents an alkenylene group having 4 to 7 carbon atoms and optionally substituted with a fluorine atom and forming a cyclic group together with the sulfur atom of the sulfonyl group,
X represents a sulfonyl group, a phosphoryl group, or a carbonyl group,
n represents 1 or 2,
wherein the group represented by O—X—$(R^1)_n$ is bonded to the 3-position of the cyclic sulfone in the formula (1),
wherein
when X is a sulfonyl group, $R^1$ is selected from the group consisting of
an alkyl group having 1 to 4 carbon atoms and optionally substituted with at least one selected from the group consisting of a fluorine atom, an aryl group, and an aryl group substituted with a fluorine atom,
an alkenyl group having 2 to 4 carbon atoms and optionally substituted with a fluorine atom,
an alkynyl group having 2 to 4 carbon atoms and optionally substituted with a fluorine atom,
an aryl group substituted with at least one selected from the group consisting of a fluorine atom and an alkyl group substituted with a fluorine atom,
an alkoxy group having 1 to 4 carbon atoms and optionally substituted with at least one selected from the group consisting of a fluorine atom, an aryl group, and an aryl group substituted with a fluorine atom,
an alkenyloxy group having 2 to 4 carbon atoms and optionally substituted with a fluorine atom,
an alkynyloxy group having 2 to 4 carbon atoms and optionally substituted with a fluorine atom, and
an aryloxy group optionally substituted with at least one selected from the group consisting of a fluorine atom, an alkyl group substituted with a fluorine atom, and an alkoxy group,
when X is a phosphoryl group, $R^1$ is selected from the group consisting of
an alkyl group having 1 to 4 carbon atoms and optionally substituted with at least one selected from the group consisting of a fluorine atom, an aryl group, and an aryl group substituted with a fluorine atom, an alkenyl group having 2 to 4 carbon atoms and
optionally substituted with a fluorine atom,
an alkynyl group having 2 to 4 carbon atoms and
optionally substituted with a fluorine atom,
an aryl group optionally substituted with at least one
selected from the group consisting of a fluorine
atom, an alkyl group, and an alkyl group substituted
with a fluorine atom,
an alkoxy group having 1 to 4 carbon atoms and
optionally substituted with at least one selected from
the group consisting of a fluorine atom, an aryl
group, and an aryl group substituted with a fluorine
atom,
an alkenyloxy group having 2 to 4 carbon atoms and
optionally substituted with a fluorine atom,
an alkynyloxy group having 2 to 4 carbon atoms and
optionally substituted with a fluorine atom, and
an aryloxy group optionally substituted with at least
one selected from the group consisting of a fluorine
atom, an alkyl group, an alkyl group substituted with
a fluorine atom, and an alkoxy group, and
when X is a carbonyl group, $R^1$ is selected from the group
consisting of
a methyl group substituted with at least one selected from
the group consisting of a fluorine atom, an aryl group,
and an aryl group substituted with a fluorine atom,
an alkyl group having 2 or 3 carbon atoms and optionally
substituted with at least one selected from the group
consisting of a fluorine atom, an aryl group, and an aryl
group substituted with a fluorine atom,
an alkyl group having 4 carbon atoms, other than a
tert-butyl group, and optionally substituted with at least
one selected from the group consisting of a fluorine
atom, an aryl group, and an aryl group substituted with
a fluorine atom,
a tert-butyl group substituted with at least one selected
from the group consisting of a fluorine atom, an aryl
group, and an aryl group substituted with a fluorine
atom,
an alkenyl group having 2 to 4 carbon atoms and option-
ally substituted with a fluorine atom,
an alkynyl group having 2 to 4 carbon atoms and option-
ally substituted with a fluorine atom,
an aryl group optionally substituted with at least one
selected from the group consisting of a fluorine atom,
an alkyl group, and an alkyl group substituted with a
fluorine atom,
an alkoxy group having 1 to 4 carbon atoms and option-
ally substituted with at least one selected from the
group consisting of a fluorine atom, an aryl group, and
an aryl group substituted with a fluorine atom,
an alkenyloxy group having 2 to 4 carbon atoms and
optionally substituted with a fluorine atom,
an alkynyloxy group having 2 to 4 carbon atoms and
optionally substituted with a fluorine atom, and
an aryloxy group optionally substituted with at least one
selected from the group consisting of a fluorine atom,
an alkyl group, an alkyl group substituted with a
fluorine atom, and an alkoxy group.

2. The additive for nonaqueous electrolyte solutions
according to claim 1,
wherein the compound represented by the formula (1) is
a compound represented by the following formula (2):

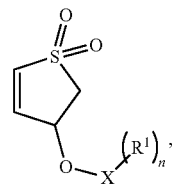

(2)

wherein in the formula (2), X, $R^1$, and n have the same
meanings as X, $R^1$, and n, respectively, in the formula
(1).

3. The additive for nonaqueous electrolyte solutions
according to claim 1,
wherein X is a sulfonyl group.

4. A lithium ion capacitor comprising:
a nonaqueous electrolyte solution comprising the additive
of claim 1, a nonaqueous solvent, and an electrolyte
salt;
a positive electrode; and
a negative electrode.

5. A nonaqueous electrolyte solution comprising:
an additive;
a nonaqueous solvent; and
an electrolyte salt,
wherein the additive comprises a compound represented
by the following formula (1):

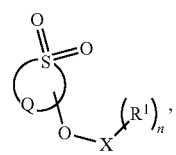

(1)

wherein in the formula (1),
Q represents an alkenylene group having 4 to 7 carbon
atoms and optionally substituted with a fluorine atom
and forming a cyclic group together with the sulfur
atom of the sulfonyl group,
X represents a sulfonyl group, a phosphoryl group, or a
carbonyl group,
$R^1$ is selected from the group consisting of
an alkyl group having 1 to 4 carbon atoms and optionally
substituted with at least one selected from the group
consisting of a fluorine atom, an aryl group, and an aryl
group substituted with a fluorine atom,
an alkenyl group having 2 to 4 carbon atoms and option-
ally substituted with a fluorine atom,
an alkynyl group having 2 to 4 carbon atoms and option-
ally substituted with a fluorine atom,
an aryl group optionally substituted with at least one
selected from the group consisting of a fluorine atom or
an alkyl group substituted with a fluorine atom,
an alkoxy group having 1 to 4 carbon atoms and option-
ally substituted with at least one selected from the
group consisting of a fluorine atom, an aryl group, and
an aryl group substituted with a fluorine atom,
an alkenyloxy group having 2 to 4 carbon atoms and
optionally substituted with a fluorine atom,
an alkynyloxy group having 2 to 4 carbon atoms and
optionally substituted with a fluorine atom, and
an aryloxy group optionally substituted with at least one
selected from the group consisting of a fluorine atom, an alkyl group, an alkyl group substituted with a fluorine atom, and an alkoxy group, and n represents 1 or 2, wherein the group represented by $O-X-(R^1)_n$ is bonded to the 3-position of the cyclic sulfone in the formula (1), an amount of the compound represented by the formula (1) is 0.005% to 10% by mass based on a total mass of the nonaqueous electrolyte solution, and the electrolyte salt comprises a lithium salt.

6. The nonaqueous electrolyte solution according to claim 5, wherein the nonaqueous solvent includes cyclic carbonate and/or chained carbonate.

7. An electricity storage device comprising:

the nonaqueous electrolyte solution according to claim 5;

a positive electrode; and a negative electrode.

8. A lithium ion battery comprising:

the nonaqueous electrolyte solution according to claim 5;

a positive electrode; and a negative electrode.

\* \* \* \* \*